United States Patent
Konja et al.

(10) Patent No.: US 7,359,506 B2
(45) Date of Patent: Apr. 15, 2008

(54) OPENING AND CLOSING DEVICE AND ELECTRONIC EQUIPMENT USING THE SAME

(75) Inventors: Takehiko Konja, Fukui (JP); Yasuchika Kudo, Fukui (JP); Katsuichi Minami, Fukui (JP); Koji Sakai, Fukui (JP); Katsumasa Yamaguchi, Kanagawa (JP); Masayuki Miki, Kanagawa (JP); Naomasa Suzuki, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 724 days.

(21) Appl. No.: 10/775,906

(22) Filed: Feb. 10, 2004

(65) Prior Publication Data

US 2004/0184600 A1     Sep. 23, 2004

(30) Foreign Application Priority Data

Feb. 14, 2003   (JP)   ................. 2003-036424

(51) Int. Cl.
*H04M 9/00* (2006.01)
*H04M 1/00* (2006.01)

(52) U.S. Cl. .................. 379/433.13; 379/433.11; 455/575.3

(58) Field of Classification Search ........... 379/433.13, 379/433.11; 455/90.3, 575.1, 575.3; 16/284, 16/326, 342, 330
See application file for complete search history.

(56) References Cited

U.S. PATENT DOCUMENTS

| 4,782,528 | A | * | 11/1988 | Inoue et al. ................. 379/455 |
| 5,628,089 | A | * | 5/1997 | Wilcox et al. ................ 16/303 |
| 5,697,124 | A | * | 12/1997 | Jung ........................... 16/341 |
| 5,923,751 | A | * | 7/1999 | Ohtsuka et al. ......... 379/433.13 |
| 6,115,886 | A | * | 9/2000 | Fujita ........................... 16/330 |
| 6,292,980 | B1 | * | 9/2001 | Yi et al. ....................... 16/303 |
| 6,459,887 | B2 | | 10/2002 | Okuda |
| 6,886,221 | B2 | * | 5/2005 | Minami et al. ............... 16/324 |
| 7,007,345 | B2 | * | 3/2006 | Nakase et al. ............... 16/330 |
| 7,017,233 | B2 | * | 3/2006 | Hsu et al. ..................... 16/324 |
| 2001/0053674 | A1 | * | 12/2001 | Katoh ......................... 455/90 |
| 2003/0153284 | A1 | * | 8/2003 | Minami et al. ............... 455/90 |
| 2004/0224730 | A1 | * | 11/2004 | Sakai et al. ............. 455/575.3 |

FOREIGN PATENT DOCUMENTS

| JP | 08-225044 | 9/1996 |
| JP | 2002-089542 | 3/2002 |
| JP | 2002-276643 | 9/2002 |
| JP | 2004-232791 | 8/2004 |

* cited by examiner

*Primary Examiner*—Curtis Kuntz
*Assistant Examiner*—Phylesha L Dabney
(74) *Attorney, Agent, or Firm*—RatnerPrestia

(57) ABSTRACT

Inclined plane is provided at the tip of rotor cam. On the other hand, inclined planes are also provided in specific positions of stator cam. Because of this structure, in the specific positions, the inclined planes are in resilient contact with each other. Thus, the load is increased only in the specific positions without an increase in the load of spring. This structure can provide an opening and closing device capable of securely holding only desired positions without affecting the feel of opening and closing operation of the entire device, and electronic equipment using the device.

11 Claims, 6 Drawing Sheets

OPENING AND CLOSING DEVICE AND ELECTRONIC EQUIPMENT USING THE SAME

FIELD OF THE INVENTION

The present invention relates to an opening and closing device for use in various kinds of electronic equipment, e.g. a portable telephone and small personal computer. It also relates to electronic equipment using the opening and closing device.

BACKGROUND OF THE INVENTION

As various kinds of electronic equipment, e.g. a portable telephone and small personal computer, has had more advanced or diversified functions in recent years, there is an increasing number of so-called folding type equipment in which a movable housing is attached to a fix housing of the equipment so that the movable housing can be opened and closed with respect to the fix housing. An opening and closing device for use in this type of equipment also requires that the opening and closing position should be securely held. Japanese Patent Unexamined Publication No. 2002-89542 discloses an example of those devices.

However, there has been no comparative opening and closing device that can satisfy comfortable opening and closing operations and secure opening and closing states at the same time.

SUMMARY OF THE INVENTION

An opening and closing device of the present invention is structured so that an inclined plane is formed at the tip of each of rotor cams and inclined planes are formed in specific positions of each of stator cams. Hence, in an opening state or closing state, the inclined planes provided in the specific positions of each stator cam to be in resilient contact with the corresponding rotor cam are in resilient contact with the inclined plane provided at the tip of the rotor cam. This can securely hold the state. Additionally, the inclined planes are formed only in the specific positions. For this reason, once the area in which the inclined planes are in resilient contact with each other is passed in the operation of the opening and closing device, a nimble feel of operation can be obtained.

Additional objects and advantages of the present invention will be apparent from the following detailed description of preferred embodiments thereof, which are best understood with reference to the accompanying drawings.

DETAILED DESCRIPTION OF THE INVENTION

Figure 6:
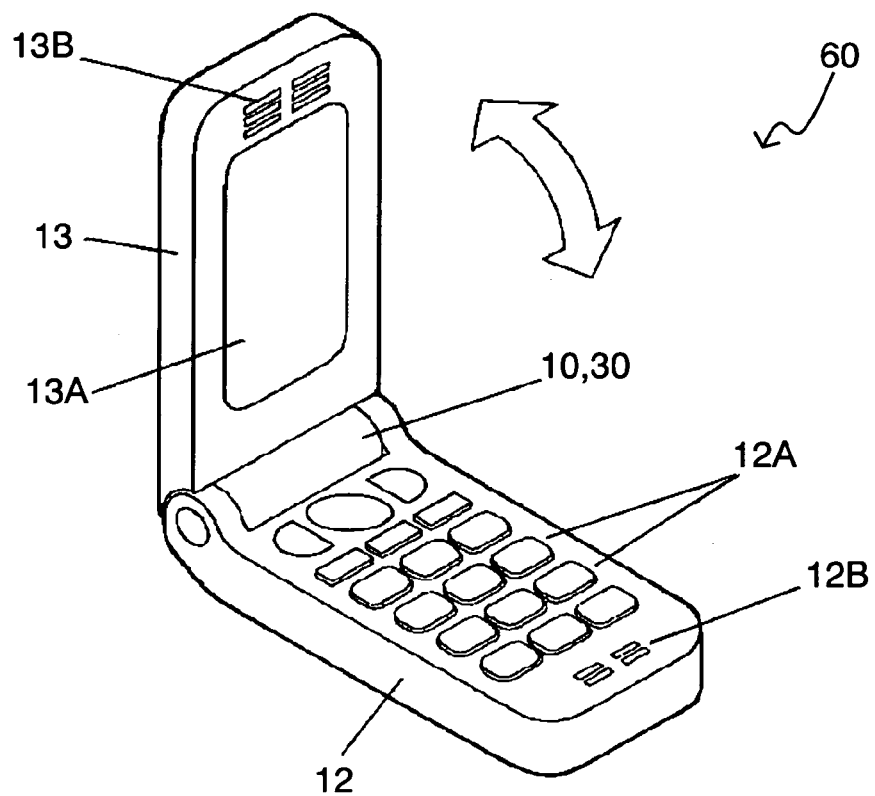
FIG. 6 is a perspective view of electronic equipment in accordance with the exemplary embodiment of the present invention.
Figure 7:
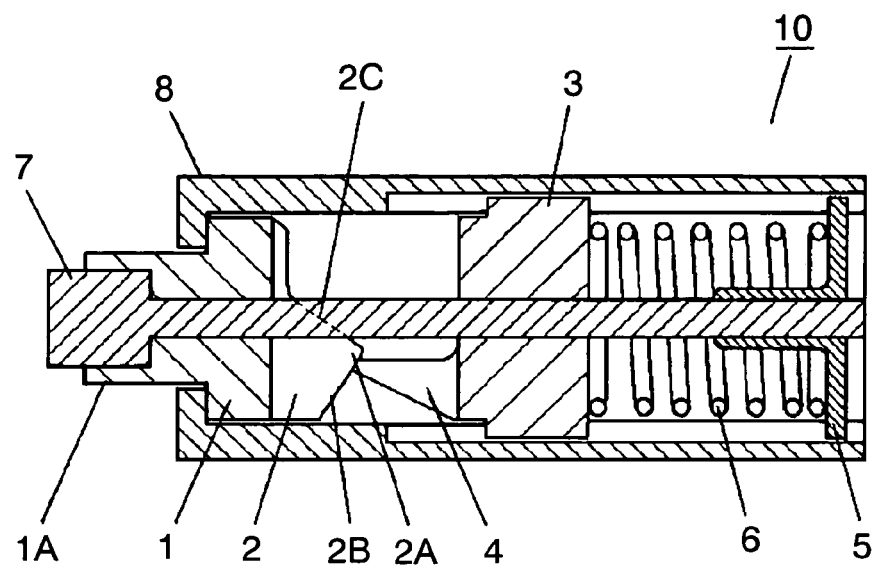
FIG. 7 is a sectional view of a comparative opening and closing device.
Figure 8:
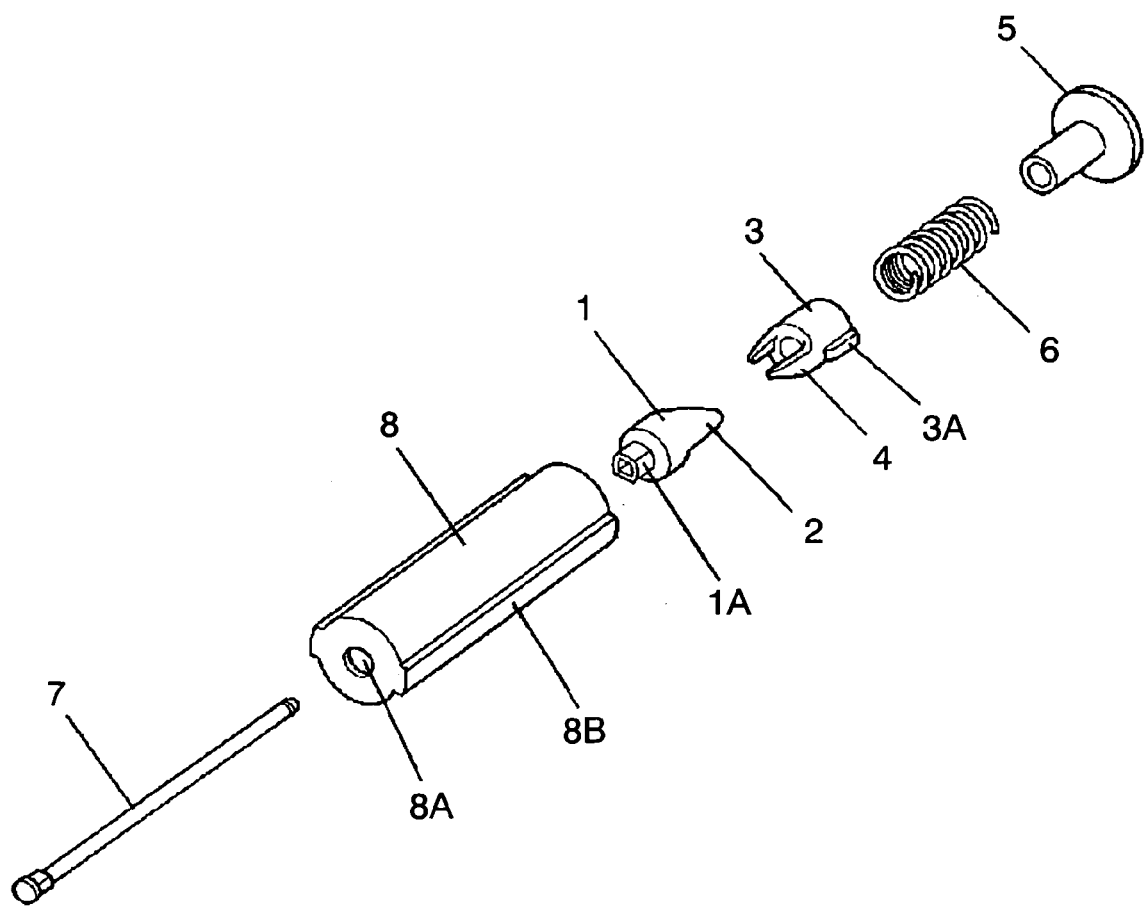
FIG. 8 is an exploded perspective view of the comparative opening and closing device.

A description is provided of a comparative opening and closing device and electronic equipment using the device, with reference to FIGS. 6 through 8. In the sectional view of these drawings, the radial direction is enlarged to facilitate understanding of the relation between a stator cam and rotor cam.

As shown in FIGS. 7 and 8, substantially cylindrical stator 1 having a hollow part in the center thereof has stator cams 2. Each stator cam 2 has projecting top portion 2A formed along the outer periphery of the right side face thereof, and two tilting portions 2B and 2C extending laterally from projecting top portion 2A.

Substantially cylindrical rotor 3 rotatably disposed with respect to stator 1 in opening and closing directions has rotor cams 4 along the outer periphery of the left side face thereof, i.e. the face opposed to stator cams 2. Between substantially disk-shaped cover 5 and stator 3, coil-shaped spring 6 is installed in substantially a contracted state. Spring 6 brings the tips of rotor cams 4 into resilient contact with tilting portions 2B of stator cams 2.

Stator 1 is fixed to the left end of substantially columnar fix shaft 7. The right end of the fix shaft is engaged with cover 5, with the fix shaft passing through the hollow part of rotor 3 and spring 6.

From hole 8A at the left end of substantially tubular rotary case 8, fixed part 1A of stator 1 rotatably projects. Into grooves 8B along the inner periphery of rotary case 8, protrusions 3A on rotor 3 are inserted. Thus, rotor 3 is accommodated in rotary case 8 to be movable in the axial direction.

Cover 5 covers an opening at the right end of rotary case 8. Rotor 1, stator 3, spring 6 and other components are accommodated in rotary case 8. Thus, opening and closing device 10 is structured.

An example of so structured opening and closing device 10 for use in portable telephone 60 is shown in FIG. 6. Fixed part 1A is fixed to fix housing 12 that has operating part 12A made of a plurality of keys, and sound input part 12B, e.g. a microphone, formed on the top face thereof. On the other hand, rotary case 8 is fixed to movable housing 13 that has display 13A, e.g. liquid crystal display (LCD), and sound output part 13B, e.g. a speaker, formed on the surface thereof. Thus produced is portable telephone 60 in which opening and closing device 10 journals movable housing 13 so that the movable housing can be opened and closed with respect to fix housing 12.

In this opening and closing device 10, while the tip of each rotor cam 4 is in resilient contact with tilting portion 2B on the lower side of each stator cam 2 as shown in FIG. 7, rotor 3 is urged in the closing direction corresponding to the downward direction in the drawing by substantially contracted spring 6. As a result, movable housing 13 fixed to rotary case 8 is held in the closing state with respect to fix housing 12.

When movable housing 13 is opened by hands in this closing state, rotor 3 rotates via rotary case 8 fixed to movable housing 13 to further contract spring 6. The tip of rotor cam 4 moves from tilting portion 2B of stator cam 2 through projecting top portion 2A, slides upwardly, and comes into resilient contact with upper tilting portion 2C. Thus, rotor 3 is urged to the opening direction corresponding to the upward direction in the drawing to open movable housing 13.

In other words, rotation of rotary case 8 fixed to movable housing 13 rotates rotor 3 and the tip of rotor cam 4 passes through projecting top portion 2A of stator cam 2. When the tip of rotor cam 4 passes through projecting top portion 2A, spring 6 is most contracted and urges rotor 3 strongly. The tip of rotor cam 4 moves to either of tilting portions 2B and 2C, passing through projecting top portion 2A as the boundary while being urged by spring 6. Thus, the operation of opening and closing movable housing 13 with respect to fix housing 12 is performed.

As described above, for the comparative opening and closing device, if the load of spring 6 is increased, for example, to securely hold the opening or closing state of movable housing 13 even with slight shocks applied thereto, the load imposed when the tip of rotor cam 4 passes through projecting top portion 2A of stator cam 2 will also increase, accordingly. This poses a problem of increasing the operating load of the entire device.

Exemplary Embodiment

An exemplary embodiment of the present invention is described hereinafter with reference to FIGS. 1 through 6.

In the description, same components used in the comparative opening and closing device are denoted with the same reference marks for simplifying explanation. In the sectional views of these drawings, the radial direction is enlarged to facilitate understanding of the relation between a stator cam and rotor cam.

Figure 1:
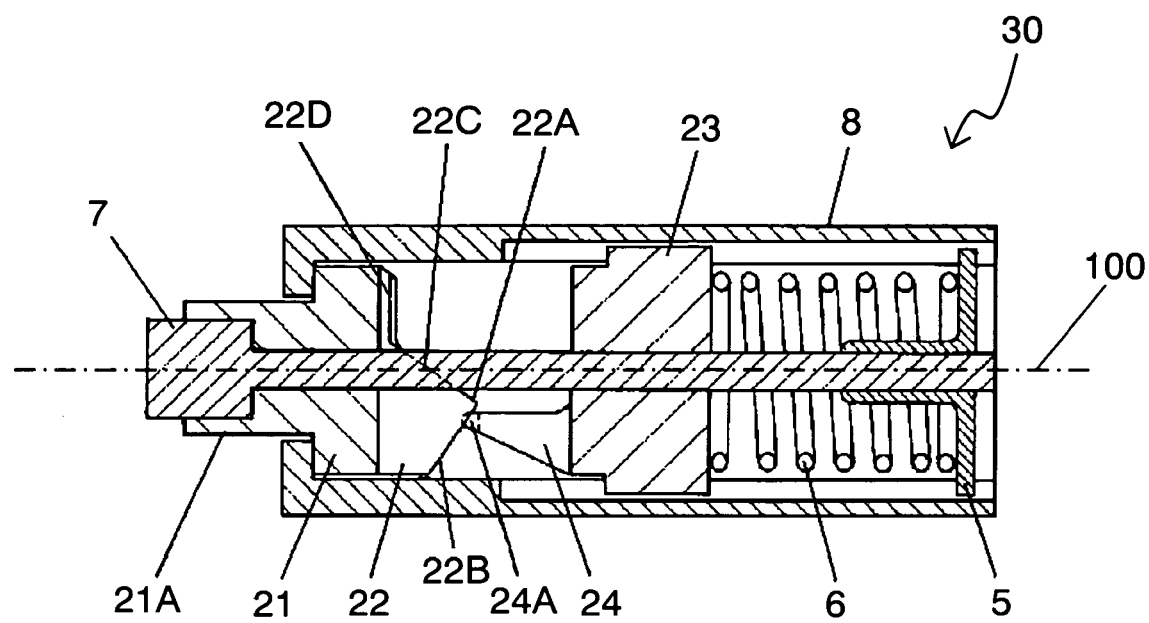
FIG. 1 is a sectional view of an opening and closing device in accordance with an exemplary embodiment of the present invention.
Figure 2:
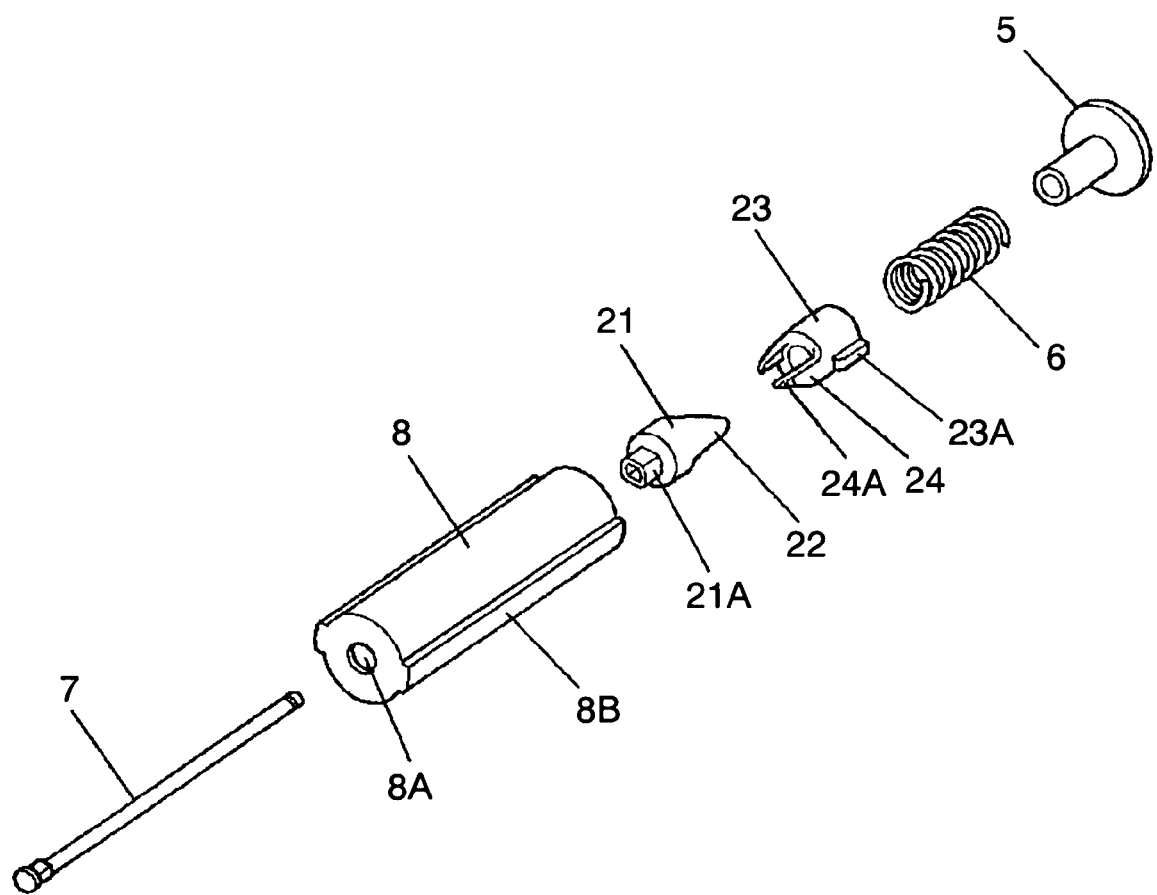
FIG. 2 is an exploded perspective view of the opening and closing device in accordance with the exemplary embodiment of the present invention.

FIGS. 1 and 2 show an opening and closing device in accordance with an exemplary embodiment of the present invention. Provided along the outer periphery of the right side face of substantially hollow cylindrical stator 21 made of steel, cupper alloys, or the like are a plurality of stator cams 22 symmetrical with respect to central axis 100. Each stator cam has projecting portions and flat portions 22D. The projecting portion have projecting top portion 22A, first tilting portion 22B and second tilting portion 22C extending laterally from projecting top portion 22A.

Additionally, inclined planes 22E and 22F, which will be described later, are provided in specific positions on tilting portion 22B and flat portion 22D of each stator cam 22 on the side wall of inner periphery thereof to be in resilient contact with corresponding rotor cam 24 during opening or closing the device.

Substantially hollow cylindrical rotor 23 made of metal is disposed rotatably in the opening and closing directions with respect to stator 21. Rotor 23 has a plurality of rotor cams 24 symmetrical with respect to central axis 100 along the outer periphery of the left side face thereof opposed to stator cams 22. Inclined plane 24A is formed on the side wall of outer peripheral side of tip 25 of each rotor cam 24. Now, the opening and closing directions refer to either of clockwise direction and counter-clockwise direction around axis 100.

Between rotor 23 and substantially disk-shaped cover 5, coil-shaped spring 6 is installed in a substantially contracted state. Spring 6 brings tips 25 into resilient contact with tilting portions 22B of stator cams 22.

Stator 21 is fixed to the left end of substantially columnar fix shaft 7. On the other hand, the right end of the fix shaft is engaged with cover 5, with the fix shaft passing through the hollow part of rotor 23 and spring 6.

Further, fixed part 21A of stator 21 rotatably projects from hole 8A at the left end of substantially hollow tubular rotary case 8. Into grooves 8B formed along the inner periphery of rotary case 8, protrusions 23A on rotor 23 are inserted. Thus, rotor 23 is accommodated in rotary case 8 to be movable parallel to axis 100. Grooves 8B are formed from the inner periphery toward the outer periphery of rotary case 8. With reference to FIG. 2, the grooves are formed in the inner surfaces of the portions protruding from the outer periphery of the rotary case.

At last, cover 5 covers an opening at the right end of rotary case 8. Stator 21, rotor 23, spring 6 and other components are accommodated in rotary case 8. Thus, opening and closing device 30 is structured.

An example of so structured opening and closing device 30 for use in portable telephone 60 is shown in FIG. 6. Fixed part 21A of opening and closing device 30 is fixed to fix housing 12 that has operating part 12A made of a plurality of keys, and sound input part 12B, e.g. a microphone, formed on the top face thereof. On the other hand, rotary case 8 is fixed to movable housing 13 that has display 13A, e.g. LCD, and sound output part 13B, e.g. a speaker, formed on the surface thereof. Thus produced is portable telephone 60 in which opening and closing device 30 journals movable housing 13 so that the movable housing can be opened and closed with respect to fix housing 12.

Next, descriptions are provided of an opening and closing device as structured above and the opening and closing operations of electronic equipment using the opening and closing device, with reference to FIGS. 1, 2, 3A through 3C, and 4A through 4C.

In fact, stator cams 22 and rotor cams 24 are structures provided along the outer peripheries of substantially hollow cylinders and thus have three-dimensional shapes. However, to facilitate understanding of the operation of each component and the relation of the relative position between the respective components, FIGS. 3A through 3C and 4A through 4C show schematic views in which parts of the cams are expanded in a plane.

Figure 3A:
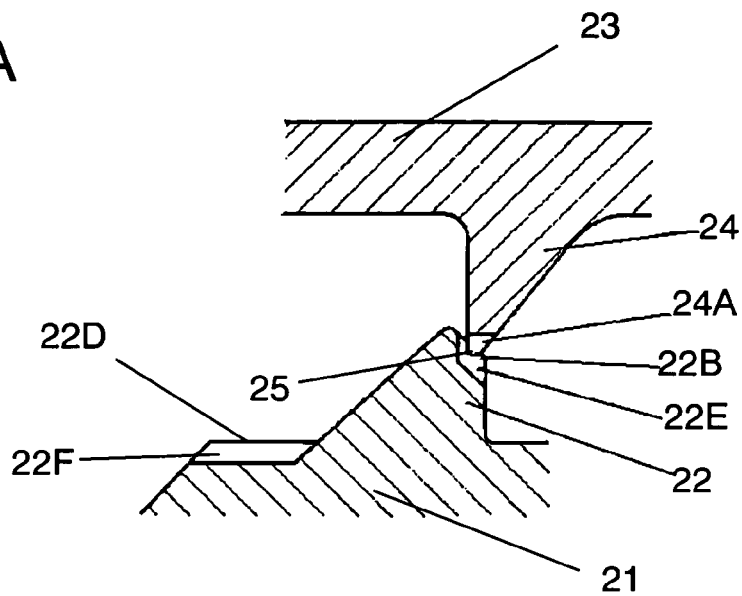
FIGS. 3A through 3C are sectional views of an essential part of the opening and closing device in accordance with the exemplary embodiment of the present invention for illustrating the operation thereof.

First, while tip 25 of each rotor cam 24 is in resilient contact with tilting portion 22B of each stator cam 2 as shown in FIG. 1, rotor 23 is urged in the closing direction corresponding to the downward direction by spring 6. As a result, movable housing 13 fixed to rotary case 8 is held in the closing state with respect to fix housing 12. FIG. 3A schematically illustrates this state.

Figure 4A:
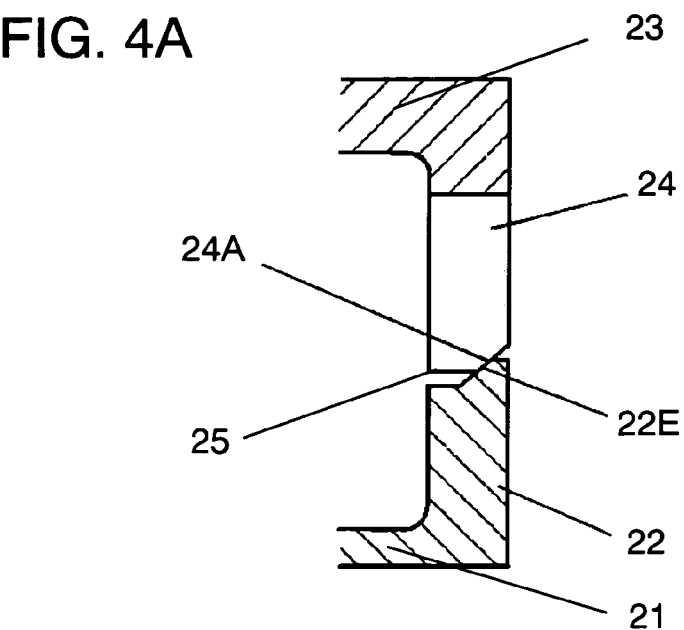
FIGS. 4A through 4C are sectional views of an essential part of the opening and closing device in accordance with the exemplary embodiment of the present invention for illustrating the operation thereof.

Further, in this closing state, inclined plane 24A formed on the outer peripheral side of tip 25 of rotor cam 24 is in resilient contact with inclined plane 22E formed on the inner peripheral side of tilting portion 22B of stator cam 22, as shown in FIG. 4A. For this reason, the distributed load of spring 6 urging rotor cam 24 is imposed on both inclined planes in resilient contact with each other. Thus, friction between inclined planes 24A and 22E increases. As a result, the device is structured so that the closing state can securely be held even when shocks smaller than a certain magnitude are applied to movable housing 13.

When movable housing 13 is opened by hands in this closing state, rotor 23 rotates upwardly via rotary case 8 fixed to movable housing 13. The tip of rotor cam 24 moves on tilting portion 22B of stator cam 22 toward projecting top portion 22A in resilient contact therewith.

Figure 3B:
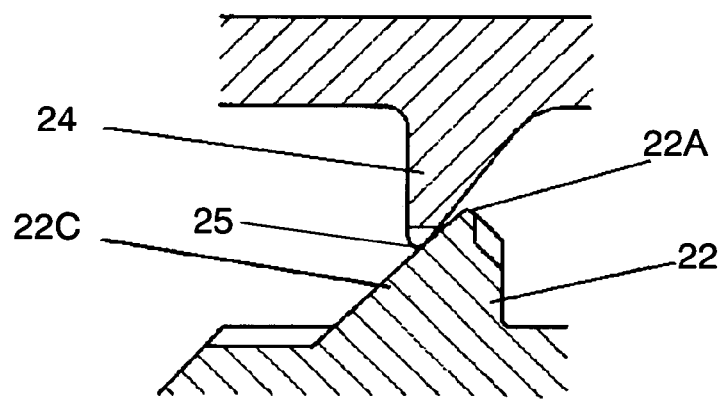
Figure 4B:
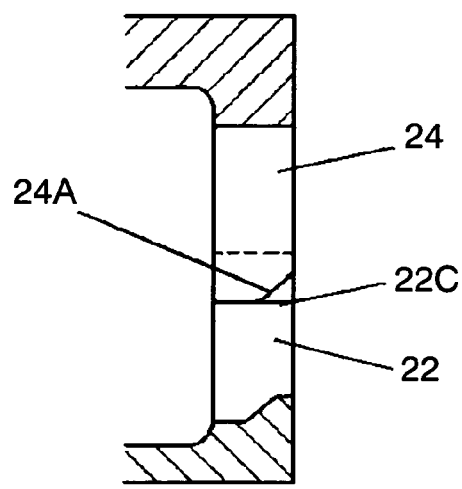

As shown in FIGS. 3B and 4B, no inclined plane 22E is provided in the vicinity of projecting top portion 22A and on tilting portion 22C of stator cam 22. For this reason, the flat surface of the tip on the inner peripheral side of rotor cam 24 slides on the flat surface of stator cam 22. Although spring 6 largely contracts, the distributed load of rotor cam 24 is not exerted on stator cam 22, and tip 25 of rotor cam 24 moves with relatively small friction.

Then, tip 25 of rotor cam 24 passes through projecting top portion 22A of stator cam 22, moves the upward direction in FIG. 1, and comes into resilient contact with tilting portion 22C. At this time, rotor 23 is urged to the opening direction corresponding to the upward direction by spring 6 to open movable housing 13.

Figure 3C:
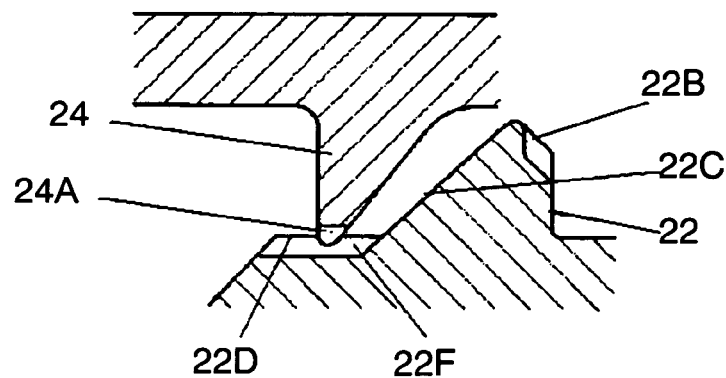
Figure 4C:
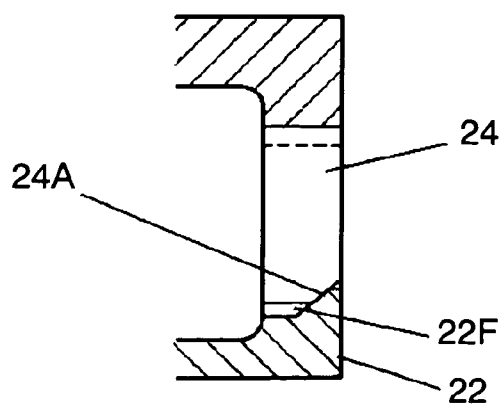

When tip 25 of rotor cam 24 further moves on tilting portion 22C as shown in FIGS. 3C and 4C, the tip comes into resilient contact with flat portion 22D of stator cam 22. Because inclined plane 22F similar to inclined plane 22B is provided on the inner peripheral side of flat portion 22D, inclined plane 24A formed at the tip of rotor cam 24 comes into resilient contact with inclined plane 22F face to face. As a result, distributed load of spring 6 is generated and increases the friction between inclined planes 24A and 22F. This securely holds the closing sate.

When tip 25 of rotor cam 24 is in resilient contact with flat portion 22D of stator cam 22, fix housing 13 is generally opened at an angle of at least 90°. In this state, display 13A can be seen. Distance of contact between inclined planes 24A and 22F is dependent on the length of inclined planes 22F. And the contact distance is in correspondence with certain angle between fix housing 12 and movable housing 13 when they are in open condition. By moving movable housing 13 in either of the opening and closing direction to change the position in which tip 25 of rotor cam 24 is in resilient contact with flat portion 22D, display 13A can be adjusted and held at an angle so as to be seen easily. For example, a user of a cell phone equipped with the opening and closing device of this embodiment can stably change the opening angle from 100° to 150° so that he can obtain the most preferable viewing angle.

In other words, when movable housing 13 is opened or closed, rotary case 8 fixed to movable housing 13 rotates and tip 25 of rotor cam 24 moves in resilient contact with tilting portion 22B or 22C of stator cam 22. At that time, when tip 25 is in resilient contact with tilting portion 22B or flat portion 22D, inclined plane 24A is in resilient contact with inclined plane 22E or 22F face to face. This increases friction force and stably holds the opening or closing state. On the other hand, when tip 25 is in a position near projecting top portion 22A of stator cam 22, these cams are not in resilient contact with each other face to face. This decreases friction; thus, a nimble opening or closing operation can be performed with relatively small load.

As described above, in this embodiment, providing inclined planes 24A, 22F, and 22E can increase load only in specific positions without an increase in the load of spring 6. This structure can provide an opening and closing device capable of securely hold desired positions without affecting the feel of opening and closing operation of the entire device and electronic equipment using the device.

Contrary to the above description, an inclined plane can be formed only on projecting top portion 22A of each stator cam 22 to increase the load imposed only when rotor cam 24 moves from the opening state to the closing state or vice versa in resilient contact with the inclined plane. In this case, positive click-feeling is given in the opening and closing operation. In this manner, the load during opening and closing operation in given positions can be adjusted.

Figure 5:
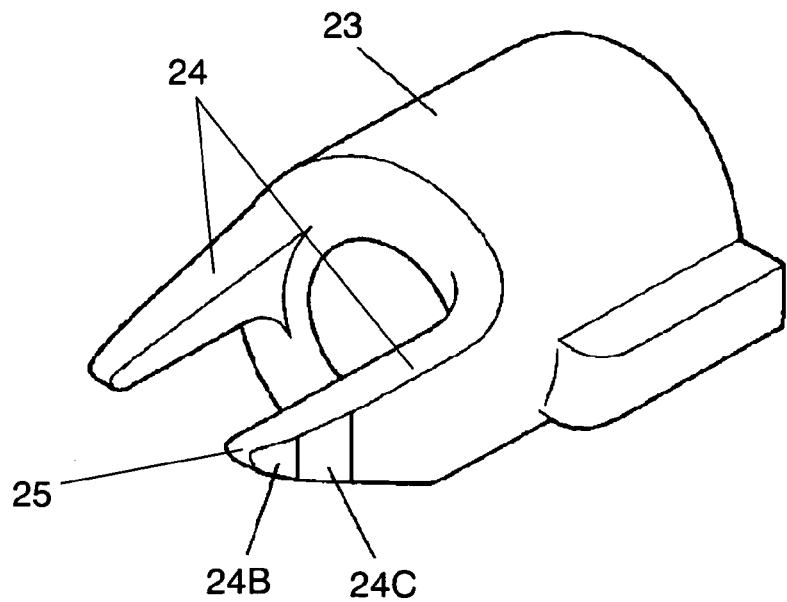
FIG. 5 is a perspective view of an essential part of the opening and closing device in accordance with the exemplary embodiment of the present invention.

Further, as inclined planes 24B and 24C in FIG. 5 show an example, a plurality of inclined planes of different angles can be formed at the tips of rotor cams 24 and a plurality of inclined planes of different angles can be formed in specific positions of stator cams 22. This structure brings rotor cams 24 into resilient contact with stator cams 22 in the inclined planes of different angles in an opening or closing state, or during an opening or closing operation. This can change the component of force and friction force generated at that time, thus realizing an opening and closing device providing various feels of operation during opening and closing operations.

The above embodiment shows the opening and closing device which has the stator cam having a flat portion and a projecting portion both of which are formed on a side of the stator. The projecting portion has a projecting top portion, a first tilting portion and a second tilting portion, and the first tilting portion and the second tilting portion extend from the projecting top portion. At least one of the first tilting portion without involving the projecting top portion and the flat portion has the first inclined plane, and the flat portion is connected to the second tilting portion. In the device of the embodiment the inclined plane of the stator cam faces to an inclined plane formed at the tips of rotor cams.

Another embodiment shows the opening and closing device which has the rotor cam having a flat portion and a projecting portion both of which are formed on a side of the rotor. The projecting portion has a projecting top portion, a third tilting portion and a fourth tilting portion, and the third tilting portion and the fourth tilting portion extend from the projecting op portion. At least one of the third tilting portion without involving the projecting top portion and the flat portion has a first inclined plane, and the flat portion is connected to the fourth tilting portion. In the device of the another embodiment the inclined plane of the rotor cam faces to an inclined plane formed at the tips of stator cams.

The present invention can apply to devices other than an opening and closing device in which rotary case 8 fixed to movable housing 13 is rotated by opening and closing the movable housing with hands. For example, the present invention can be implemented by a so-called one-push open structure. For this structure, other components, e.g. a push button and reverse-cam for reversing the position in which rotor cam 24 is in resilient contact with stator cam 22, are provided and movable housing 13 is opened by depressing the push button in the closing state in addition to opening and closing operation by hands.

As described above, the present invention provides the following advantages: realizing an opening and closing device capable of securely holding only desired positions without affecting the feel of opening and closing operation, and electronic equipment using the device.

It will be obvious to those skilled in the art that various changes may be made in the above-described embodiments of the present invention. However, the scope of the present invention should be determined by the following claims.

What is claimed is:

1. An opening and closing device for use in a telephone handset comprising:
   a stator having a stator cam; and
   a rotor having a rotor cam urged to the stator cam by a spring, and rotatable with respect to the stator;
   wherein, the stator cam includes:

a flat stator portion and a projecting stator portion, the projecting stator portion including a first tilting portion and a second tilting portion extending from the flat stator portion to the first tilting portion, and a first inclined plane formed on a side wall of at least one of the first tilting portion and the flat stator portion; and wherein, the rotor cam includes:

a projecting rotor portion; and a second inclined plane formed on a side wall of the projecting rotor portion; and wherein, friction between the stator cam and the rotor cam is greater (a) when the first inclined plane and the second inclined plane are in contact with each other than (b) when the first inclined plane and the second inclined plane are not in contact with each other.

2. The opening and closing device of claim 1, wherein the projecting portion of the stator cam has a projecting top portion, the first tilting portion and the second tilting portion extend from the projecting top portion, at least one of the first tilting portion and the second tilting portion without involving the projecting top portion and the flat portion has the first inclined plane, and the flat portion is connected to the second tilting portion.

3. The opening and closing device of claim 1, wherein the rotor cam further includes a flat portion formed on a side of the rotor, wherein the projecting portion further includes a projecting top portion, a third tilting portion and a fourth tilting portion, the third tilting portion and the fourth tilting portion extend from the projecting top portion, at least one of the third tilting portion and the fourth tilting portion without involving the projecting top portion and the flat portion has the second inclined plane, and the flat portion is connected to the fourth tilting portion.

4. The opening and closing device of claim 1, wherein the first inclined plane includes a plurality of inclined planes of different angles of inclination and the second inclined plane includes a plurality of inclined planes of different angles of inclination.

5. The opening and closing device of claim 1 for use in electronic equipment, the electronic equipment comprising:

a fix housing having at least one of an operating part and a sound input part formed on a top face thereof; and a movable housing having at least one of a display and a sound output part formed on a surface thereof;

wherein the stator is attached to the fix housing; and the rotor is attached to the movable housing.

6. The opening and closing device of claim 1 for use in electronic equipment, the electronic equipment comprising:

a fix housing having at least one of an operating part and a sound input part formed on a top face thereof; and a movable housing having at least one of a display and a sound output part formed on a surface thereof;

wherein the stator is attached to the movable housing; and the rotor is attached to the fix housing.

7. Electronic equipment including a telephone handset having an opening and closing device, the electronic equipment comprising:

a fix housing having at least one of an operating part and a sound input part formed on a top face thereof;

a movable housing having at least one of a display and a sound output part formed on a surface thereof; and the opening and closing device comprising:

a stator having a stator cam;

a rotor having a rotor cam urged to the stator cam by a spring, and rotatable with respect to the stator;

wherein, the stator cam includes:

a flat stator portion and a projecting stator portion, the projecting stator portion including a first tilting portion and a second tilting portion extending from the flat stator portion to the first tilting portion, and a first inclined plane formed on a side wall of at least one of the first tilting portion and the flat stator portion; and wherein, the rotor cam includes:

a projecting rotor portion; and a second inclined plane formed on a side wall of the projecting rotor portion; and wherein, friction between the stator cam and the rotor cam is greater (a) when the first inclined plane and the second inclined plane are in contact with each other than (b) when the first inclined plane and the second inclined plane are not in contact with each other.

8. The electronic equipment of claim 7, wherein the stator is attached to the fix housing, and the rotor is attached to the movable housing.

9. The electronic equipment of claim 7, wherein the first inclined plane and the second inclined plane contact with each other when the fix housing and the movable housing are closed.

10. The electronic equipment of claim 7, wherein the first inclined plane and the second inclined plane contact with each other when the fix housing and the movable housing are opened at a predetermined angle.

11. The opening and closing device of claim 1, wherein the rotor cam further includes a flat portion formed on a side of the rotor, wherein the projecting portion of the stator cam further includes a projecting top portion, a third tilting portion and a fourth tilting portion, the third tilting portion and the fourth tilting portion extend from the projecting top portion, at least one of the third tilting portion and the fourth tilting portion without involving the projecting top portion and the fiat portion has the second inclined plane, and the flat portion is connected to the fourth tilting portion, and wherein the first inclined plane is formed on a side wall of the projecting top portion of the stator cam; and the first inclined plane formed on the side wall of the projecting top portion of the stator cam contacts the second inclined plain formed on at least one of the third tilting portion and the fourth tilting portion without involving the projecting top portion and the fiat portion of the rotor.

* * * * *

UNITED STATES PATENT AND TRADEMARK OFFICE
CERTIFICATE OF CORRECTION

| | | |
|---|---|---|
| PATENT NO. | : 7,359,506 B2 | Page 1 of 1 |
| APPLICATION NO. | : 10/775906 | |
| DATED | : April 15, 2008 | |
| INVENTOR(S) | : Konja et al. | |

It is certified that error appears in the above-identified patent and that said Letters Patent is hereby corrected as shown below:

<u>Column 8</u>

Line 54 of the Letters Patent, in claim 11, "second inclined plain" should read --second inclined plane--.

Signed and Sealed this

Ninth Day of September, 2008

JON W. DUDAS
*Director of the United States Patent and Trademark Office*